No. 656,564. Patented Aug. 21, 1900.
W. McCABE.
COLLAR FOR SHAFTING AND PULLEYS.
(Application filed Apr. 2, 1900.)
(No Model.)
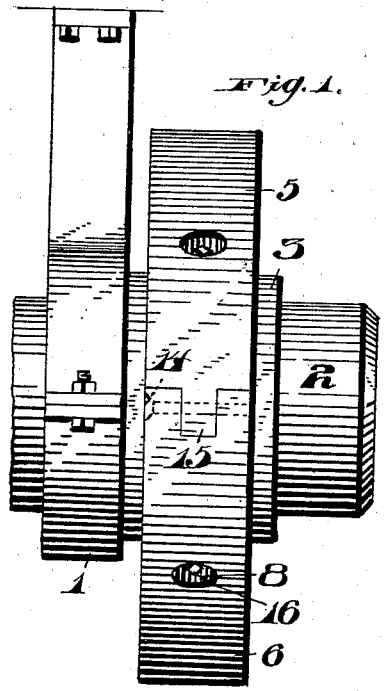
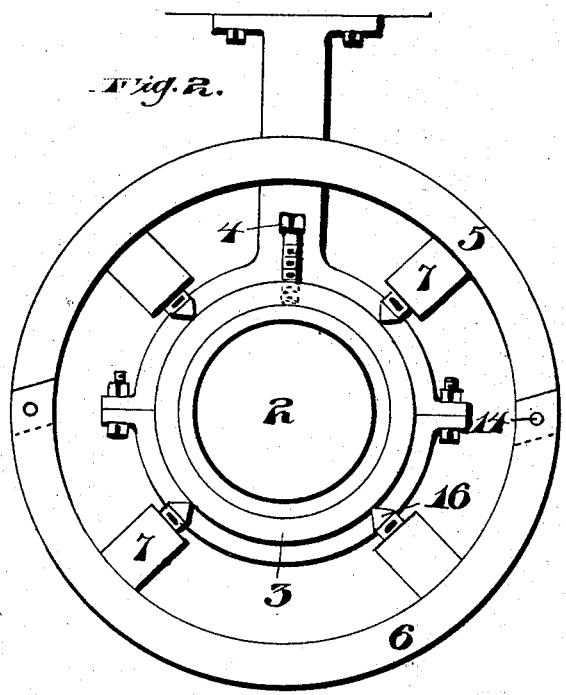
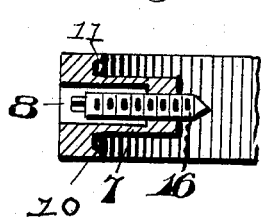
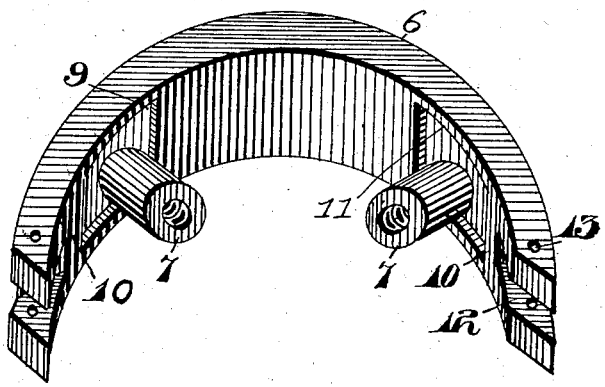
Witnesses
Inventor
William McCabe.
by
Attorneys

UNITED STATES PATENT OFFICE.

WILLIAM McCABE, OF PITTSBURG, PENNSYLVANIA.

COLLAR FOR SHAFTING AND PULLEYS.

SPECIFICATION forming part of Letters Patent No. 656,564, dated August 21, 1900.

Application filed April 2, 1900. Serial No. 11,112. (No model.)

*To all whom it may concern:*

Be it known that I, WILLIAM MCCABE, a citizen of the United States of America, residing at Pittsburg, in the county of Allegheny and State of Pennsylvania, have invented certain new and useful Improvements in Collars for Shafting and Pulleys, of which the following is a specification, reference being had therein to the accompanying drawings.

This invention relates to certain new and useful improvements in set-screw guards, and is particularly adapted for the ends of shafting.

One object of my invention is to provide a guard of this character which is adapted to surround stop-collars or a shaft and their set screw or screws to prevent the lateral movement of the shaft and which is adapted to prevent the engagement or catching of the set-screws in any object or the wearing-apparel of an operator or workman, overcoming thereby any inconvenience or injury to the operator or workman, as is often the case in machine-shops or mills at present.

Another object of the invention is to construct a set-screw guard of this character which shall be extremely simple in construction, strong, durable, efficient in its use, and comparatively inexpensive to manufacture and set up.

Briefly described, the invention consists of a concentric band formed of two sections, each section provided on its inner face with sleeves, with each sleeve having a set-screw mounted therein for engagement with a stop-collar or with a shaft.

The invention finally consists in the novel construction, combination, and arrangement of parts, to be hereinafter described, and particularly pointed out in the claims.

In describing the invention in detail, reference is had to the accompanying drawings, forming a part of this specification, wherein like numerals of reference indicate corresponding parts throughout the several views, in which—

Figure 1 is a side view of a portion of a shaft and its hanger, showing the stop-collar with my improved guard mounted thereon. Fig. 2 is an end view thereof. Fig. 3 is a perspective view of one section of the guard. Fig. 4 is a cross-sectional view of a portion of one of the sections of the safeguard through one of the sleeves, showing the arrangement of the set-screw therein. Fig. 5 is a side view of the set-screw.

Referring to the drawings by reference-numerals, 1 indicates an ordinary hanger for supporting a shaft 2, the latter having mounted thereon a stop-collar 3, which bears against the inner side of the hanger 1 to prevent the lateral movement of the shaft 2. The stop-collar 3 is retained in position by means of the set-screw 4, operating therethrough and engaging the shaft. Of course it is evident the collar revolves with the shaft.

Surrounding a portion of the collar 3 is my improved set-screw guard, which consists of a pair of semicircular sections 5 6, constructed of suitable material and provided with a pair of inwardly-extending interiorly-screw-threaded sleeves 7, each registering with the opening 8, formed in the section, as shown. The inner face of each of the sections is cut away, as at 9, and this cut-away portion may extend from one strengthening-web 10 to the opposite strengthening-web 11. The section 6 has each end bifurcated, as at 12, and is provided with openings 13, through which operates the screw or stud 14 for securing in position the tenon 15, formed integral with the section 5. Arranged in each of the sleeves 7 and adapted to engage the collar 3 is a set-screw 16, which is of such length that the same will always be countersunk within the sleeve, as shown. These set-screws are for the purpose of adjusting the position of the guard and for securing the same to the stop-collar 3, so that it will revolve in unison with the latter and the shaft 2.

It is thought the many advantages of my improved construction of set-screw guard can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. A set-screw guard consisting of a pair of semicircular sections suitably connected together and adapted to surround a stop-collar and its screws, a series of sleeves formed integral with the inner face of said sections, and means arranged in said sleeves for adjusting the position of said guard.

2. A set-screw guard consisting of a pair of semicircular sections suitably connected together and adapted to surround a stop-collar and its set-screws, a series of sleeves formed integral with the inner face of said sections, and a set-screw arranged in each of said sleeves and adapted to engage the stop-collar for adjusting the position of said guard.

3. A set-screw guard consisting of a pair of semicircular sections one of which is provided with bifurcated ends and the other of which has a pair of openings, means for securing said sections together, and means carried by said sections for adjusting the position of said guard.

4. A set-screw guard consisting of a pair of semicircular sections one of which is provided with bifurcated ends and the other of which has a pair of openings, means for securing said sections together, a series of sleeves formed integral with the inner face of said sections, and means arranged in said sleeves for adjusting the position of said guard.

5. A set-screw guard consisting of a pair of semicircular sections one of which is provided with bifurcated ends and the other of which has a pair of openings, means for securing said sections together, a series of sleeves formed integral with the inner face of said sections, and a set-screw arranged in each of said sleeves and adapted to engage the stop-collar for adjusting the position of said guard.

In testimony whereof I affix my signature in the presence of two witnesses.

WILLIAM McCABE.

Witnesses:
JOHN NOLAND,
N. L. BOGAN.